(12) United States Patent
So et al.

(10) Patent No.: US 10,849,471 B2
(45) Date of Patent: Dec. 1, 2020

(54) ROBOT CLEANER AND METHOD FOR DRIVING THE SAME

(71) Applicant: Samsung Electronics Co., Ltd., Suwon-si, Gyeonggi-do (KR)

(72) Inventors: Jea-yun So, Yongin-si (KR); Dae-hyung Kim, Suwon-si (KR); Jin-hee Kim, Incheon (KR); Han-kyeol Kim, Seoul (KR); Gi-hyeong Lee, Suwon-si (KR); Ju-sang Lee, Suwon-si (KR); Yeon-kyu Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 15/657,034

(22) Filed: Jul. 21, 2017

(65) Prior Publication Data

US 2018/0116475 A1     May 3, 2018

(30) Foreign Application Priority Data

Oct. 28, 2016   (KR) .......................... 10-2016-0141684

(51) Int. Cl.
*A47L 9/00*     (2006.01)
*A47L 9/28*     (2006.01)
(Continued)

(52) U.S. Cl.
CPC ............ *A47L 9/009* (2013.01); *A47L 9/2826* (2013.01); *A47L 9/2852* (2013.01);
(Continued)

(58) Field of Classification Search
CPC ...... A47L 9/009; A47L 9/2826; A47L 9/2852; A47L 9/2857; A47L 9/2873; A47L 9/2805; A47L 2201/022; A47L 2201/04; A47L 2201/06; A47L 2201/00; B25J 9/00; B25J 9/0003; G05D 1/0094; G05D 1/0238; G05D 1/0242; G05D 1/0255; G05D 2201/0215; G05D 2201/0203; G05D 1/0231; G08G 5/045; B60G 2800/424; B60T 2201/022
(Continued)

(56) References Cited

U.S. PATENT DOCUMENTS 6,515,614 B2 *   2/2003   Sakai ................... G05D 1/0257
                                                          342/70
7,103,449 B2 *   9/2006   Woo ..................... G05D 1/0225
                                                          318/568.1
(Continued)

FOREIGN PATENT DOCUMENTS

KR         10-0140500 B1    7/1998
KR      10-2004-0062039 A   7/2004
(Continued)

*Primary Examiner* — Orlando E Aviles
*Assistant Examiner* — Robert F Neibaur (57) ABSTRACT

A robot cleaner includes a cleaner main body, a driver to move the cleaner main body, a sensor to sense an obstacle, and a sensor driver to rotate the sensor so that the sensor reciprocates in left and right directions within a predetermined angle range about a reference direction. In addition, a processor controls the driver to adjust a traveling direction of the cleaner main body based on the sensing result of the sensor, and to change the reference direction with a rotation direction if the cleaner main body is rotated.

13 Claims, 9 Drawing Sheets

(51) Int. Cl.
*G05D 1/00* (2006.01)
*G05D 1/02* (2020.01)

(52) U.S. Cl.
CPC ........... *A47L 9/2857* (2013.01); *A47L 9/2873* (2013.01); *G05D 1/0094* (2013.01); *G05D 1/0238* (2013.01); *G05D 1/0242* (2013.01); *G05D 1/0255* (2013.01); *A47L 2201/022* (2013.01); *A47L 2201/04* (2013.01); *G05D 2201/0215* (2013.01)

(58) Field of Classification Search
USPC ..................................... 15/319; 701/28, 301
See application file for complete search history.

(56) References Cited

U.S. PATENT DOCUMENTS

| | | | |
|---|---|---|---|
| 7,239,105 B2* | 7/2007 | Lim | G05D 1/0246 318/568.11 |
| 7,706,921 B2 | 4/2010 | Jung | |
| 7,856,291 B2 | 12/2010 | Jung et al. | |
| 8,326,019 B2 | 12/2012 | Lee et al. | |
| 8,744,628 B2* | 6/2014 | Tang | A47L 9/009 700/245 |
| 8,825,266 B2* | 9/2014 | Naderhirn | G08G 5/045 342/109 |
| 9,020,641 B2* | 4/2015 | Jeong | G01S 17/46 700/259 |
| 9,149,167 B2 | 10/2015 | Hong et al. | |
| 9,339,163 B2* | 5/2016 | Noh | G05D 1/0231 |
| 9,399,284 B2 | 7/2016 | Kwon et al. | |
| 9,504,367 B2 | 11/2016 | Kim et al. | |
| 9,968,232 B2* | 5/2018 | Watanabe | A47L 9/2852 |
| 10,019,013 B2* | 7/2018 | Kwak | A47L 9/009 |
| 10,152,062 B2* | 12/2018 | Schnittman | G05D 1/0227 |
| 10,398,273 B2* | 9/2019 | Watanabe | A47L 9/0488 |
| 2006/0259212 A1 | 11/2006 | Jeon | |
| 2009/0048727 A1* | 2/2009 | Hong | G05D 1/0238 701/26 |
| 2014/0304937 A1 | 10/2014 | Kim et al. | |

FOREIGN PATENT DOCUMENTS

| | | |
|---|---|---|
| KR | 10-0459411 B1 | 12/2004 |
| KR | 10-0492539 B1 | 6/2005 |
| KR | 10-0492540 B1 | 6/2005 |
| KR | 10-0492584 B1 | 6/2005 |
| KR | 10-0575706 B1 | 3/2006 |
| KR | 20-0412601 Y1 | 3/2006 |
| KR | 10-0575708 B1 | 4/2006 |
| KR | 10-0619744 B1 | 9/2006 |
| KR | 10-0640752 B1 | 10/2006 |
| KR | 10-0640753 B1 | 10/2006 |
| KR | 10-0669892 B1 | 1/2007 |
| KR | 10-677260 B1 | 2/2007 |
| KR | 10-2007-0027840 A | 3/2007 |
| KR | 10-0738887 B1 | 7/2007 |
| KR | 10-2007-0087759 A | 8/2007 |
| KR | 10-0776944 B1 | 11/2007 |
| KR | 10-0788791 B1 | 1/2008 |
| KR | 10-0791384 B1 | 1/2008 |
| KR | 10-0818740 B1 | 4/2008 |
| KR | 10-2008-0045523 A | 5/2008 |
| KR | 10-0829094 B1 | 5/2008 |
| KR | 10-0867896 B1 | 11/2008 |
| KR | 10-2009-0033782 A | 4/2009 |
| KR | 10-0947012 B1 | 3/2010 |
| KR | 10-2010-0134958 A | 12/2010 |
| KR | 10-2013-0019286 A | 2/2013 |
| KR | 10-2013-0042422 A | 4/2013 |
| KR | 10-1395892 B1 | 5/2014 |
| KR | 10-20140096692 A | 8/2014 |
| KR | 10-2014-0123174 A | 10/2014 |
| KR | 10-1467341 81 | 12/2014 |
| KR | 10-01470364 B1 | 12/2014 |
| KR | 10-2015-0050602 A | 5/2015 |
| KR | 10-2015-0057959 A | 5/2015 |
| KR | 10-0566207 B1 | 11/2015 |

\* cited by examiner

ROBOT CLEANER AND METHOD FOR DRIVING THE SAME

CROSS-REFERENCE TO RELATED APPLICATIONS) AND CLAIM OF PRIORITY

This application is related to and claims priority to Korean Patent Application No. 10-2016-0141684 filed on Oct. 28, 2016, the contents of which are incorporated herein by reference in their entirety.

TECHNICAL FIELD

The present disclosure relates to a robot cleaner and a method for driving the same, and more particularly, to a robot cleaner and a method for driving the same, which can change an obstacle sensing area in accordance with a traveling direction of the robot cleaner.

BACKGROUND

A robot cleaner is a device which automatically cleans areas to be leaned through sucking of foreign substances while traveling by itself even without any user's manipulation.

The robot cleaner is provided with various kinds of sensors in order to accurately and efficiently sense obstacles that are scattered in a traveling direction of the robot cleaner. The sensors provided on the robot cleaner may sense locations of obstacles and distances from the obstacles, and the robot cleaner may determine the traveling direction thereof using the result of the sensing.

A robot cleaner in the related art has a fixed type sensor mounted thereon, and thus the sensor has a fixed sensing range. Accordingly, the robot cleaner can sense only obstacles that exist within the fixed sensing range of the sensor. As a result, the robot cleaner in the related art has the problem that it is unable to efficiently reflect various proceeding situations that occur during driving of the robot cleaner.

SUMMARY

To address the above-discussed deficiencies, it is an object to provide a robot cleaner and a method for driving the same, which can change an obstacle sensing range of a sensor in accordance with a traveling direction of the robot cleaner.

According to aspect of the present disclosure, a robot cleaner includes a cleaner main body; a driver configured to move the cleaner main body; a sensor provided on the cleaner main body to sense an obstacle; a sensor driver configured to rotate the sensor so that the sensor reciprocates in left and right directions within a predetermined angle range about a reference direction; and a processor configured to control the driver to adjust a traveling direction of the cleaner main body in accordance with the sensing result of the sensor, and to change the reference direction in accordance with a rotation direction if the cleaner main body is rotated.

The processor may change the reference direction in accordance with a position of a wall if the cleaner main body travels to follow the waif The processor may change the reference direction based on a position of the sensed obstacle if the obstacle is sensed within a reciprocating rotation range of the sensor.

The robot cleaner according to the aspect of the present disclosure may further include a displacement sensor configured to sense a reciprocating rotation range of the sensor, wherein the processor changes at least one of the reference direction and the reciprocating rotation range if the reciprocating rotation range that is sensed by the displacement sensor does not match the predetermined angle range.

The robot cleaner according to the aspect of the present disclosure may further include an impact sensor configured to sense an impact with the obstacle, wherein the processor re-changes the reference direction so that an impact sensing direction is included in the angle range if the impact with the obstacle is sensed by the impact sensor.

The processor may activate the sensor driver and the sensor if there occurs at least one of an event in which the cleaner main body secedes from a charging station during charging of the cleaner main body, an event in which a power of the charging station is turned off during charging of the cleaner main body, an event in which the cleaner main body is traveling, and an event in which the cleaner main body returns to the charging station for charging of the cleaner main body, and the processor may inactivate the sensor driver and the sensor if there occurs at least one of an event in which the cleaner main body is being charged, and an event in which the cleaner main body is in a standby state.

The sensor may be arranged to be inclined downward on the cleaner main body so that the cleaner main body can sense the obstacle on a floor, surface or bottom side on which the cleaner main body is located or put.

According to another aspect of the present disclosure, a method for driving a robot cleaner includes rotating a sensor provided on a cleaner main body of the robot cleaner so that the sensor reciprocates within a predetermined angle range about a reference direction; adjusting a traveling direction of the robot cleaner in accordance with the sensing result of the sensor; and changing the reference direction in accordance with a rotation direction of the robot cleaner if the robot cleaner is rotated.

The method according to the aspect of the present disclosure may further include changing the reference direction in accordance with a position of a wall if the cleaner main body travels to follow the wall.

The method according to the aspect of the present disclosure may further include changing the reference direction based on a position of an obstacle if the obstacle is sensed within a reciprocating rotation range of the sensor.

The method according to the aspect of the present disclosure may further include sensing a reciprocating rotation range of the sensor; and changing at least one of the reference direction and the reciprocating rotation range if the sensed reciprocating rotation range does not match the predetermined angle range.

The method according to the aspect of the present disclosure may further include sensing an impact with the obstacle; and re-changing the reference direction so that an impact sensing direction is included in the angle range if the impact with the obstacle is sensed.

The method according to the aspect of the present disclosure may further include activating the sensor if there occurs at least one of an event in which the cleaner main body secedes from a charging station during charging of the cleaner main body, an event in which a power of the charging station is turned off during charging of the cleaner main body, an event in which the cleaner main body is traveling, and an event in which the cleaner main body returns to the charging station for charging of the cleaner main body, in a state where the sensor is inactivated; and inactivating the sensor if there occurs at least one of an event in which the cleaner main body is being charged, and an event in which the cleaner main body is in a standby state, in a state where the sensor is activated.

The rotating the sensor to reciprocate the sensor may be activated if there occurs at least one of an event in which the cleaner main body secedes from a charging station during charging of the cleaner main body, an event in which a power of the charging station is turned off during charging of the cleaner main body, and an event in which the cleaner main body is traveling, and the rotating the sensor may be inactivated if there occurs at least one of an event in which the cleaner main body is being charged, an event in which the cleaner main body returns to the charging station for charging of the cleaner main body, and an event in which the cleaner main body is in a standby state.

The sensor may be arranged to be inclined downward on the cleaner main body so that the cleaner main body can sense an obstacle on a bottom side on which the cleaner main body is put.

According to various aspects of the present disclosure, since the obstacle sensing range of the sensor is changed on the basis of the traveling direction of the robot cleaner, the position of the obstacle and the distance from the obstacle can be effectively determined.

Additional and/or other aspects and advantages of the disclosure will be set forth in part in the description which follows and, in part, will be obvious from the description, or may be learned by practice of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terns "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWING

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
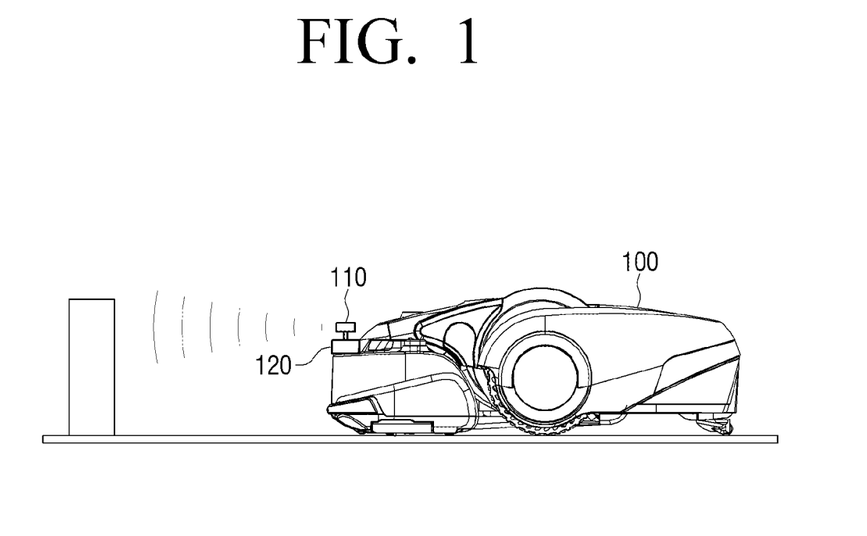
FIGS. 1 and 2 are views explaining the operation of a robot cleaner according to an embodiment of the present disclosure.
Figure 2:
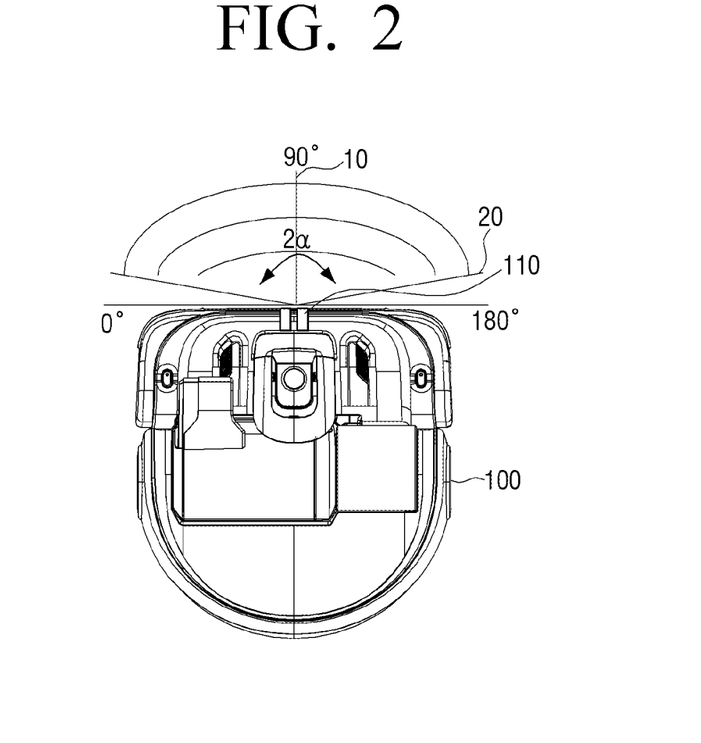

FIGS. 1 and 2 are views explaining the operation of a robot cleaner according to an embodiment of the present disclosure. A robot cleaner means a device that is driven by a power to automatically suck foreign substances. FIG. 1 illustrates a robot cleaner that is implemented in a flat shape that comes in close contact with the floor to suck foreign substances on the floor. However, this is merely exemplary, and the shape and the size of the robot cleaner may be implemented in diverse manners.

Referring to FIG. 1, a robot cleaner 100 includes a sensor 110 and a sensor driver 120.

The sensor 110 means a sensor that senses surrounding objects of the robot cleaner 100. The surrounding objects may be various kinds of things or situations that may be obstacles to traveling of the robot cleaner 100 or may cause damage or trouble of the robot cleaner 100. In the description of the present disclosure, they are called obstacles. As an example, if it is assumed that the robot cleaner is used at home, the obstacles may be various, such as walls, furniture, electronic devices, other objects, stairs, and thresholds.

The sensor 110 may be implemented by various types of sensors. For example, the sensor 110 may be implemented by an ultrasonic sensor or an infrared sensor. In the case of being implemented by the ultrasonic sensor, the sensor 110 may emit ultrasonic wave pulses, and if reflected waves that are reflected by an object are received, the sensor 110 may measure a distance from an obstacle through measurement of time between the emission of the ultrasonic waves and the reception of the reflected waves. In addition, the ultrasonic sensor may be implemented in various types including an ultrasonic proximity sensor. Further, the infrared sensor is an element that senses information of an infrared light that the obstacle has. The sensor may be implemented in various types. The sensor may analyze existence/nonexistence of an obstacle, the position of the obstacle, and the distance from the obstacle, on the basis of a sensed signal, and then may transfer the result of the analysis to a processor (not illustrated) in a cleaner main body of the robot cleaner 100. Further, depending on implementation examples, the sensor may directly transfer the sensed signal to the processor, and the processor may analyze the existence/nonexistence of an obstacle, the position of the obstacle, and the distance from the obstacle through analysis of the sensed signal.

The processor may adjust the traveling direction of the robot cleaner 100 in accordance with the result of the analysis. For example, if it is determined that an obstacle exists in front of the robot cleaner, the processor may control a driver (not illustrated) to travel forward or backward after rotating a cleaner main body rightward or leftward. Such operations will be described in detail later.

The sensor driver 120 is a constituent element that supports and rotates the sensor 110 to change the sensing direction of the sensor 110. Referring to FIG. 1, the sensor driver 120 may be provided on a lower side of the sensor 110 to rotate the sensor leftward or rightward.

The robot cleaner 100 may sense a surrounding obstacle using at least one sensor 110. FIG. 1 illustrates that one sensor 110 is arranged on a front edge side of the robot cleaner 100. However, a plurality of sensors 110 may be dispersedly arranged on edge sides of the cleaner main body of the robot cleaner 100. The sensor 110 can sense obstacles within a predetermined range. In the description of the present disclosure, an area that the sensor 110 can sense is called a sensing range.

FIG. 2 is a view explaining a reciprocating rotation range 20 of one sensor 110 through a sensor driver. The reciprocating rotation range 20 is equally arranged on left and right sides by $\alpha°$ about a reference direction 10. Accordingly, the sensor is rotated to reciprocate within a range of $2\alpha°$. The reference direction means a center direction of rotation during the reciprocating rotation of the sensor 110. Unlike this, the reference direction may be expressed as a rotational center direction, a sensing direction, or a sensing center direction, but in the present description, it is commonly called as a reference direction.

The reciprocating rotation range of the sensor 110 may be one rotation on the left or right side in accordance with the operation of the sensor driver 120. Specifically, the sensor driver 120 rotates the sensor 110 so that the sensor reciprocates in left and right directions within a predetermined angle range of $2\alpha°$ about the reference direction 10. The sensor driver 120 may create the reciprocating rotation using a motor. The motor may be implemented in various types to include one of a stepper motor, a DC motor, and a servo motor. The stepper motor is a motor that rotates by a predetermined angle in accordance with a pulse shaped voltage applied thereto.

Accordingly, the sensing range of the sensor may be changed in real time in accordance with the reciprocating rotation of the sensor through the sensor driver 120.

Hereinafter, various embodiments in which a reference direction 10 is changed on the basis of the traveling direction of a robot cleaner 100.

Figure 3A:
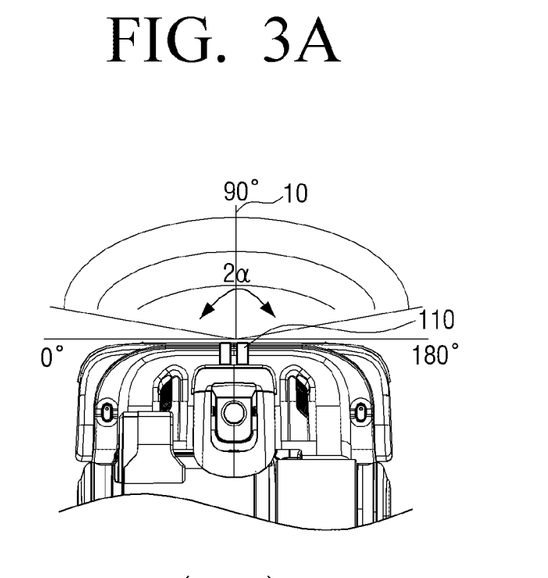
FIGS. 3A, 3B, and 3C are views explaining sensing range changes of a robot cleaner according to an embodiment of the present disclosure.
Figure 3B:
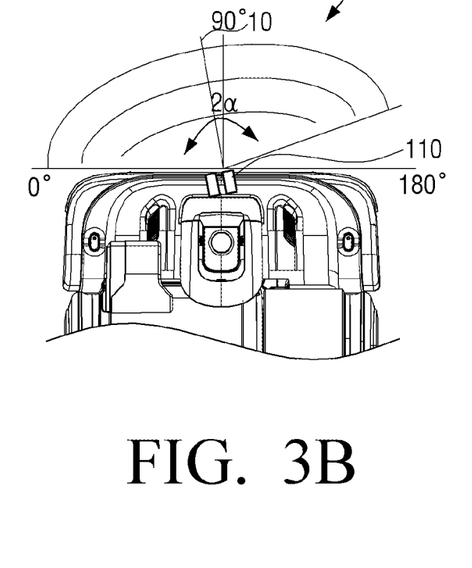
Figure 3C:
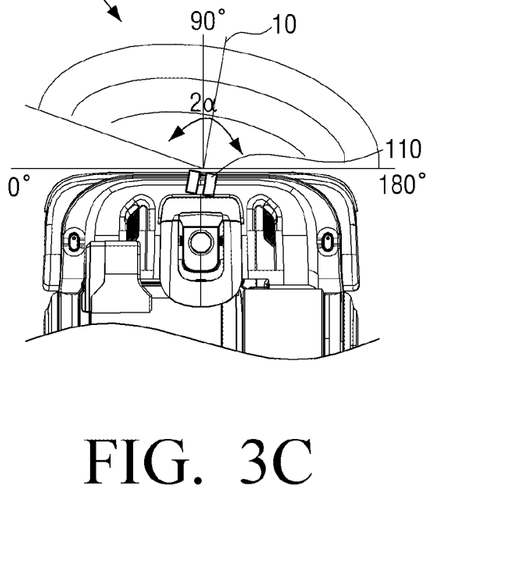

FIGS. 3A, 3B, and 3C are views explaining reference direction changes and reciprocating rotation ranges according to an embodiment of the present disclosure.

FIG. 3A illustrates a reciprocating rotation range 20 of a sensor 110 and a reference direction 10 during straight traveling of a robot cleaner 100. If left/right side motors provided in a driver (not illustrated) of a robot cleaner 100 have the same revolutions, the robot cleaner 100 may travel straight without rotation. During the straight traveling, an angular velocity of a cleaner main body is 0 rad/s. During the straight traveling of the robot cleaner, the reference direction 10 may be 90°. In this case, the reference direction 10 may coincide with the traveling direction of the robot cleaner.

As the reference direction 10 is set to 90°, the sensor driver 120 may rotate the sensor so that the sensor reciprocates by $\alpha°$ in left and right directions on the basis of 90°. The reciprocating rotation range is the predetermined angle range of $2\alpha°$. Accordingly, the sensor 110 may sense an obstacle within a range of $90°\pm\alpha°$ on the basis of 90°. For example, if the predetermined angle range of $2\alpha°$ is set to 120°, the sensor may sense the obstacle in the sensing range of 30° to 150°.

FIG. 3B illustrates a reciprocating rotation range 20 of a sensor 110 and a reference direction 10 during left-rotation traveling of a robot cleaner 100. If the revolutions of a right side motor provided in a driver are larger than the revolutions of a left side motor, the traveling direction of a cleaner main body is deflected to the left side. Accordingly, an angular velocity of the cleaner main body may be higher than 0 rad/s. If the traveling direction of the cleaner main body is deflected to the left side, the reference direction may be positioned in the range of 0° to 90°. Accordingly, if the reference direction is $\beta°$, the reciprocating rotation range 20 of the sensor 110 may be $\beta°\pm\alpha°$ (where, $0°<\beta°<90°$). For example, if the robot cleaner performs left-rotation traveling, the reference direction is changed to 45°, and the sensor may sense the obstacle through the reciprocating rotation in the range of −25° to 105°.

FIG. 3C illustrates a reciprocating rotation range 20 of a sensor 110 and a reference direction 10 during right-rotation traveling of a robot cleaner 100. If the revolutions of a left side motor provided in a driver are larger than the revolutions of a right side motor, the traveling direction of a cleaner main body is deflected to the right side. Accordingly, an angular velocity of the cleaner main body may be lower than 0 rad/s. If the traveling direction of the cleaner main body is deflected to the right side, the reference direction may be positioned in the range of 90° to 180°. Accordingly, if the reference direction is $\gamma°$, the sensing range of the sensor may be $\gamma°\pm\alpha°$ (where, $90°<\gamma°<180°$). For example, if the robot cleaner performs right-rotation traveling, the reference direction is changed to 135°, and the sensor may sense the obstacle through the reciprocating rotation in the range of 75° to 195°. For convenience in explanation, it is assumed that $\alpha°$ is 60°. However, $\alpha°$ is not limited thereto, but may be diversely set. In accordance with the setting value of a $\alpha°$, the reciprocating rotation range of the sensor 110 through the sensor driver 120 may be diversely changed.

On the other hand, the robot cleaner according to an embodiment of the present disclosure may be provided with a displacement sensor (not illustrated). The displacement sensor means a sensor for sensing the reciprocating rotation range of the sensor 110. In distinction from the predetermined angle range of 2α°, the reciprocating rotation range 20 that is sensed by the displacement sensor is an actual rotation range of the sensor 110 that is rotated to reciprocate in left and right directions through the sensor driver 120. The displacement sensor may sense the reciprocating rotation range 20 of the sensor 110. If the actual rotation range of the sensor 110 does not match the predetermined angle range of 2α° on the basis of the sensing result, the sensor driver 120 may change the reference direction 10, or may adjust the reciprocating rotation range 20 of the sensor 110 to match the predetermined angle range of 2α°.

In an embodiment of the present disclosure, if the traveling time of the robot cleaner 100 becomes long, an error may occur between the actual rotation range of the sensor 110 and the predetermined angle range of 2α°. Accordingly, the displacement sensor that is provided on the robot cleaner 100 may sense the actual rotation range of the sensor 110, and the sensor driver 120 may be controlled to offset the error on the basis of the sensing result.

On the other hand, the robot cleaner 100 according to another embodiment of the present disclosure may adjust the predetermined angle range of 2α° so as to prevent the sensor 110 for sensing an obstacle from being rotated and reciprocating in an area in which obstacle sensing is unnecessary. For example, as illustrated in FIG. 3A, the range of −90° to 0° and the range of 180° to 270°, which correspond to the back of the robot cleaner 100, may be the area in which the obstacle sensing is unnecessary. The robot cleaner 100 may determine whether the area in which the obstacle sensing is unnecessary is included in the reciprocating rotation range 20 of the sensor 110 on the basis of the sensing result of the displacement sensor. If the area in which the obstacle sensing is unnecessary is included in the reciprocating rotation range of the sensor 110, the robot cleaner 100 may change the reciprocating rotation range 20 of the sensor 110 through adjustment of the predetermined angle range of 2α°.

As illustrated in FIG. 3B, if the robot cleaner 100 according to an embodiment of the present disclosure performs the left-rotation traveling to change the reference direction to 45°, the displacement sensor senses the reciprocating rotation range (the range of −25° to 105°) 20 of the sensor 110. In this case, the robot cleaner 100 may control the sensor driver 120 so as to prevent the sensor 110 from being rotated in the range of −25° to 0°. Accordingly, the sensor 110 is rotated to reciprocate in the range of 0° to 105°.

Further, as illustrated in FIG. 3C, if the robot cleaner 100 according to an embodiment of the present disclosure performs the right-rotation traveling to change the reference direction to 135°, the displacement sensor senses the reciprocating rotation range (the range of 75° to 195°) 20 of the sensor 110. In this case, the robot cleaner 100 may control the sensor driver 120 so as to prevent the sensor 110 from being rotated in the range of 180° to 195°. Accordingly, the sensor 110 is rotated to reciprocate in the range of 75° to 180°.

Hereinafter, constituent elements provided in the robot cleaner 100 will be described in more detail.

Figure 4:
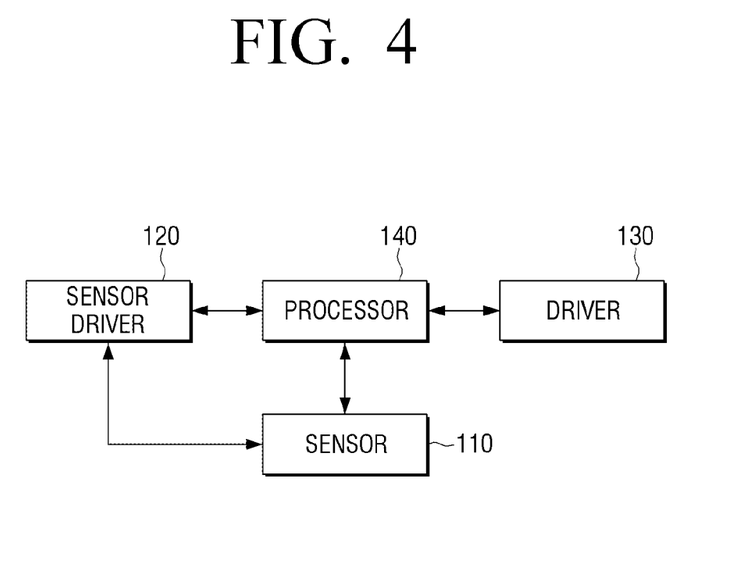
FIG. 4 is a block diagram schematically illustrating the configuration of a robot cleaner according to an embodiment of the present disclosure.

FIG. 4 is a block diagram schematically illustrating the configuration of a robot cleaner according to an embodiment of the present disclosure. As illustrated in FIG. 4, a robot cleaner 100 includes a sensor 110, a sensor driver 120, a driver 130, and a processor 140.

The driver 130 is a constituent element that moves a cleaner main body. In general, the driver 130 of the robot cleaner is provided with left/right side motors. The driver 130 may selectively drive the left/right side motors to cause the cleaner main body to perform forward, backward, and rotation traveling.

Further, the driver 130 includes driving wheels and a caster. Two driving wheels that are connected to the left/right side motors may be symmetrically arranged on left and right edges of a lower center area of the cleaner main body. The caster is installed at a front or back edge of the lower portion of the cleaner main body. The caster enables the main body to maintain a stable attitude because the rotation angle of the caster is changed in accordance with the state of the floor on which the robot cleaner 100 moves. The driving wheels and the caster may be configured as one assembly to be detachably mounted on the main body.

On the other hand, for convenience in explanation, as illustrated in FIG. 2, it is assumed that during the forward traveling of the robot cleaner, the left side of the robot cleaner corresponds to 0°, the center thereof corresponds to 90°, and the right side thereof corresponds to 180°, on the basis of the front side of the robot cleaner.

If the left/right side motors provided in the driver 130 have the same revolutions, the cleaner main body may travel straight. During the straight traveling, the angular velocity of the cleaner main body is 0 rad/s. As described above, if the angular velocity is 0 rad/s, the reference direction may coincide with the traveling direction of the cleaner main body, and the processor 140 may set the reference direction to 90°.

On the other hand, in an embodiment of the present disclosure, if the revolutions of the right side motor are larger than the revolutions of the left side motor, the robot cleaner 100 may perform left-rotation traveling. During the left-rotation traveling, the angular velocity of the cleaner main body is higher than 0 rad/s (i.e., the angular velocity of the cleaner main body >0 rad/s).

Further, in an embodiment of the present disclosure, if the revolutions of the left side motor are larger than the revolutions of the right side motor, the robot cleaner 100 may perform right-rotation traveling. During the right-rotation traveling, the angular velocity of the cleaner main body is lower than 0 rad/s (i.e., the angular velocity of the cleaner main body<0 rad/s).

The processor 140 is a constituent element that controls the overall operation of the robot cleaner 100. In particular, the processor 140 may control the driver 130 to adjust the traveling direction of the cleaner main body in accordance with the sensing result of the sensor 110. Accordingly, the processor 140 may selectively adjust the revolutions of the left/right side motors provided in the driver 130 to cause the cleaner main body to perform forward, backward, and rotation traveling.

If the cleaner main body is rotated, the processor 140 may change the reference direction on the basis of the rotation direction. In an embodiment of the present disclosure, if the angular velocity of the cleaner main body is 0 rad/s, the processor 140 may change the reference direction so as to coincide with the traveling direction of the robot cleaner 100. Accordingly, if the left/right side motors provided in the driver 130 have the same revolutions (i.e., the angular velocity of the cleaner main body=0 rad/s), the processor 140 may adjust the reference direction 10 to 90°.

Further, if the cleaner main body performs left-rotation traveling (i.e., if the angular velocity is higher than 0 rad/s), the processor 140 may deflect the reference direction 10 to the left side. For example, as illustrated in FIG. 3B, the processor 140 may position the reference direction 10 in the range of 0° to 90°.

Further, if the cleaner main body performs right-rotation traveling (i.e., if the angular velocity is lower than 0 rad/s), the processor 140 may deflect the reference direction 10 to the right side. For example, as illustrated in FIG. 3C, the processor 140 may position the reference direction 10 in the range of 90° to 180°.

On the other hand, the processor 140 according to another embodiment of the present disclosure may determine whether to change the reference direction 10 on the basis of the angular velocity of the cleaner main body. If the rotation direction of the cleaner main body is larger than a predetermined value, the processor 140 may control the sensor 110 to be rotated to reciprocate within a predetermined angle range of $2\alpha°$ without changing the reference direction 10. Accordingly, if the rotation angle of the cleaner main body is larger than the predetermined value, the reference direction 10 is not deflected to a specific direction (e.g., fixed to 90°) even during the rotation traveling of the cleaner main body, but the sensor 110 can be rotated to reciprocate within the predetermine angle range of $2\alpha°$.

For example, it may be assumed that the cleaner main body turns to the right at a standstill. If the right-rotation angle of the cleaner main body is larger than the predetermined value, the processor 140 may fix the reference direction 10 to 90°, and can control the sensor 110 to be rotated to reciprocate within the predetermined angle range of $2\alpha°$ about the reference direction 10.

Further, as described above, the processor 140 may control the overall operations of the sensor 110 and the sensor driver 120.

The processor 140 according to an embodiment of the present disclosure may activate or inactivate the sensor 110 and the sensor driver 130 in a predetermined event. Predetermined events in which the processor 140 activates or inactivates the sensor 110 and the sensor driver 130 are as shown in Table 1 below. However, the predetermined events are not limited thereto, but the sensor 110 and the sensor driver 120 may be activated in various situations in which obstacle sensing is required during traveling of the robot cleaner 100.

TABLE 1

| Division | Sensor and Sensor Driver | |
| --- | --- | --- |
| | Activation | Inactivation |
| During charging of robot cleaner 100 | | o |
| Cleaner secedes from changing station during charging, or Power of charging station is turned off. | o | |
| During homing/docking of cleaner main body into charging station | o | |
| Standby/sleep mode | | o |
| Automatic traveling | o | |
| Manual traveling | o | |
| Point-cleaning traveling | o | |
| Backward traveling (Impact with obstacle or drop) | o | |

Accordingly, the processor 140 may activate the sensor 110 and the sensor driver 120 if the cleaner main body is a traveling state, if the cleaner main body secedes from a charging station during charging or a power of the charging station is turned off, or if the cleaner main body is returning to the charging station (i.e., during homing/docking) for charging. Further, if it is determined that obstacle sensing is unnecessary, such as during charging of the robot cleaner 100 or in a standby/sleep mode, the processor 140 may inactivate the sensor 110 and the sensor driver 120.

On the other hand, although not illustrated, the robot cleaner 100 may be provided with a displacement sensor. The displacement sensor means a sensor that senses the reciprocating rotation range of the sensor 110. The displacement sensor may be implemented in various types including a limit switch, a magnetic sensor, and a potentiometer. The limit switch may be implemented to have a structure that can operate a built-in switch if an object comes in contact with a contact portion of the limit switch. The magnetic sensor may be implemented to have a structure that senses a motion of an object if the object approaches and operates a switch circuit in the magnetic sensor. The potentiometer may be implemented by a variable resistor that changes straight displacement or rotational displacement of an object to a change of an electrical resistance.

In an embodiment of the present disclosure, if the traveling time of the robot cleaner 100 becomes long, an error may occur between the predetermined angle range of $2\alpha°$ and the reciprocating rotation range 20 of the sensor 110. The processor 140 may determine whether the reciprocating rotation range 20 of the sensor 110 matches the predetermined angle range of $2\alpha°$ on the basis of the sensing result of the displacement sensor. If they do not match each other, the processor 140 may adjust at least one of the reference direction 10 and the predetermined angle range of $2\alpha°$ to offset the error that occurs between the predetermined angle range of $2\alpha°$ and the reciprocating rotation range 20.

Further, the displacement sensor may be arranged on one side or both sides of the robot cleaner 100 so as to prevent the sensor 110 from being directed toward an area in which obstacle sensing is unnecessary. It may be assumed that the back of the cleaner main body corresponds to an area in which the obstacle sensing is unnecessary on the basis of the traveling direction of the robot cleaner 100. In this case, the processor 140 may determine whether the back of the cleaner main body is included in the reciprocating rotation range 20 of the sensor 110 on the basis of the sensing result of the displacement sensor. The processor 140 may control the sensor driver 130 so that the back of the cleaner main body is not included in the reciprocating rotation range 20 through adjustment of the reference direction 10 or the predetermined angle range of $2\alpha°$.

The robot cleaner 100 according to an embodiment of the present disclosure may be provided with an impact sensor. The impact sensor may be configured to sense an impact between the robot cleaner 100 and an obstacle. The impact sensor may be implemented in various types including one of a contact type and a non-contact type. The contact type may be configured to sense an impact if the impact occurs between the robot cleaner 100 and the obstacle. Accordingly, the contact type may sense the impact through detection of a pressure change amount due to the impact. For example, the impact sensor may be implemented by a limit switch, and the limit switch may sense the impact through calculation of the pressure change amount due to the impact between the robot cleaner 100 and the obstacle.

Further, the non-contact type may be implemented by a light sensor or an ultrasonic sensor. The light sensor may sense an impact that occurs between the robot cleaner 100 and the obstacle through emission of at least one of ultraviolet radiation, infrared rays, and electromagnetic waves. The detailed configuration and operation of the impact sensor will be described later with reference to FIGS. 7A, 7B, and 7C.

Further, the robot cleaner 100 may be provided with a suction portion for sucking in dust and foreign substances on a surface to be cleaned together with air, a storage for storing various kinds of data (e.g., cleaning space and traveling path) that are necessary to automatically control the robot cleaner 100, and a traveling distance detection sensor.

A display (not illustrated) may be arranged on an upper surface of the robot cleaner 100 to display various kinds of states of the robot cleaner 100. For example, the display may display a battery charging state, whether a dust collector is fully filled with dust, a cleaning mode of the robot cleaner 100, a wall following mode, and a standby mode.

Further, the robot cleaner 100 may be provided with an inputter configured to receive an input of a command (e.g., automatic traveling, backward traveling, manual traveling, or point-cleaning traveling) from a user.

Hereinafter, various embodiments in which the reference direction 10 is changed on the basis of the traveling situation of the robot cleaner 100 will be described.

Figure 5A:
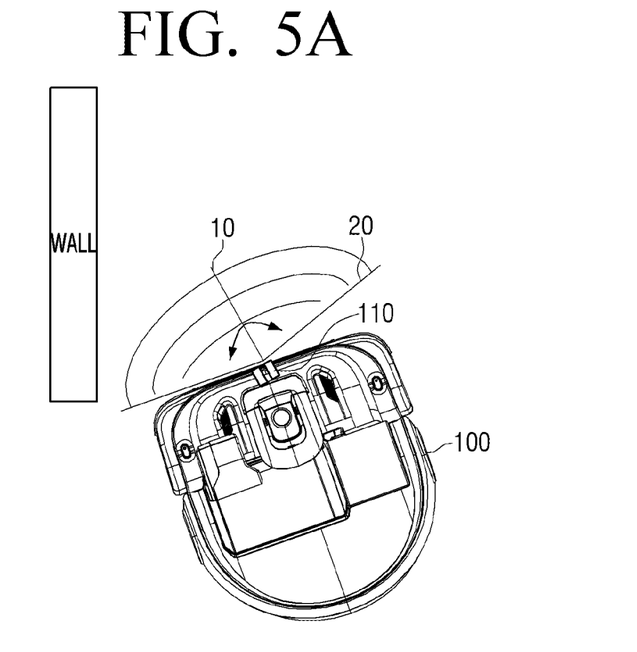
FIGS. 5A and 5B are views explaining wall-following traveling of a robot cleaner according to an embodiment of the present disclosure.
Figure 5B:
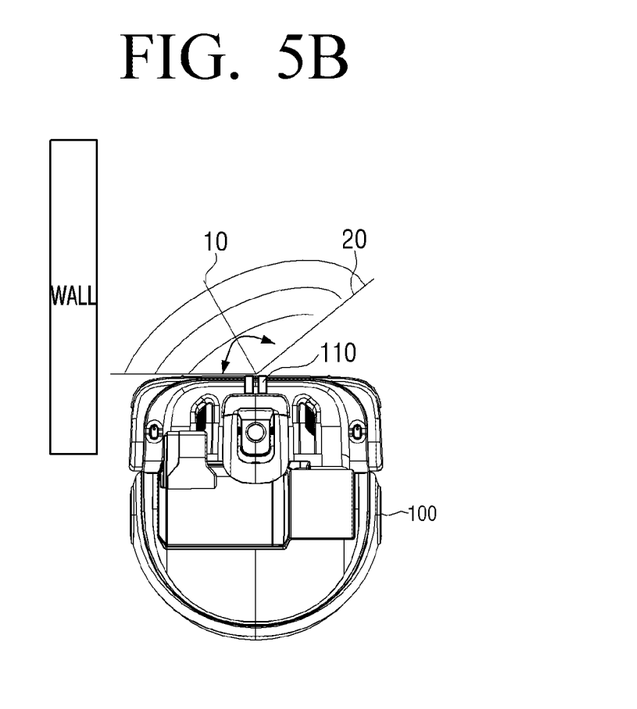

FIGS. 5A and 5B are views explaining wall-following traveling of a robot cleaner 100 according to an embodiment of the present disclosure.

A robot cleaner 100 according to an embodiment of the present disclosure may sense a wall and may perform traveling based on wall following. As illustrated in FIG. 5A, a sensor 110 may sense a wall to be followed by the robot cleaner 100. Accordingly, the sensor 110 may sense a wall that surrounds the robot cleaner 100 to generate a wall sensing signal. A processor 140 may control a driver 130 to rotate a cleaner main body along the wall on the basis of the wall sensing signal. The robot cleaner 100 may be configured to efficiently clean all areas between the wall and the robot cleaner 100 through the wall following.

As illustrated in FIG. 5B, if the cleaner main body travels to follow the wall, the processor 140 may change a reference direction 10 in accordance with the position of the wall. Accordingly, a reciprocating rotation range 20 of the sensor 110 may also be changed on the basis of the reference direction 10. For example, if a wall exists on the left side based on the traveling direction of the robot cleaner 100, the robot cleaner 100 may perform straight traveling to follow the left-side wall. In this case, the processor 140 may change the reference direction 10 so that the reference direction 10 exists in the range of 0° to 90°, and the sensor driver 120 may rotate the sensor 110 to reciprocate on the basis of the changed reference direction 10. Accordingly, if the robot cleaner 100 travels to follow the wall, the reference direction may be directed to the wall being followed.

Hereinafter, various embodiments in which a reciprocating rotation range 20 is changed during obstacle sensing will be described.

Figure 6A:
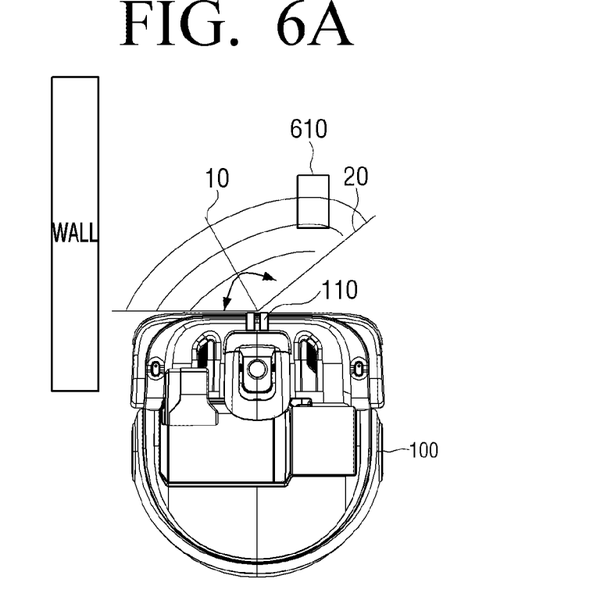
FIGS. 6A and 6B are views explaining reference direction changes if a robot cleaner senses an obstacle according to an embodiment of the present disclosure.
Figure 6B:
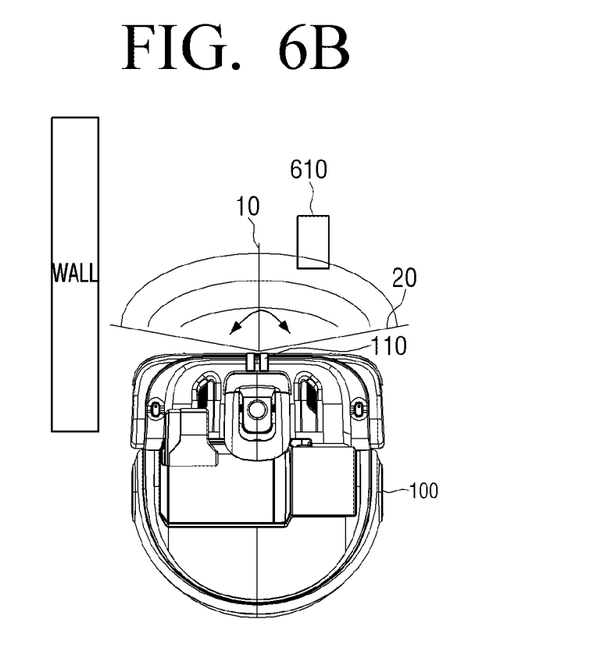

FIGS. 6A and 6B are views explaining reference direction changes if a robot cleaner senses an obstacle according to an embodiment of the present disclosure.

If an obstacle 610 is sensed within a reciprocating rotation range 20 of a sensor 110, a processor 140 may change a reference direction on the basis of the position of the sensed obstacle 610.

As illustrated in FIG. 6A, a robot cleaner 100 may travel in a state where the reference direction 10 is deflected in a specific direction. FIG. 6A illustrates a case where the robot cleaner travels to follow a left side wall, and the reference direction 10 is a left side deflection (in the range of 0° to 90°), but is not limited thereto. In a state where the reference direction 10 is deflected in the specific direction, the sensor 110 may be rotated to reciprocate in a predetermined angle range of 2α° to sense the obstacle 610 that is positioned in the reciprocating rotation range 20.

In this case, as illustrated in FIG. 6B, the processor 140 may change the reference direction 10 on the basis of the position of the sensed obstacle 610. Accordingly, the sensor 110 may sense the obstacle 610 within a new reciprocating rotation range 20 on the basis of the changed reference direction. For example, if the sensor senses the obstacle 610 that is positioned on the right side about the reference direction 10 in a state where the reference direction 10 is deflected to the right side, the processor 140 may change the reference direction to the right side. Accordingly, the sensor 110 may sense the position of the obstacle 610 that exists on the right side more accurately.

Hereinafter, various embodiments in which an impact sensor is provided on a robot cleaner 100 and a reciprocating rotation range of a sensor 110 is changed if an impact occurs will be described.

Figure 7A:
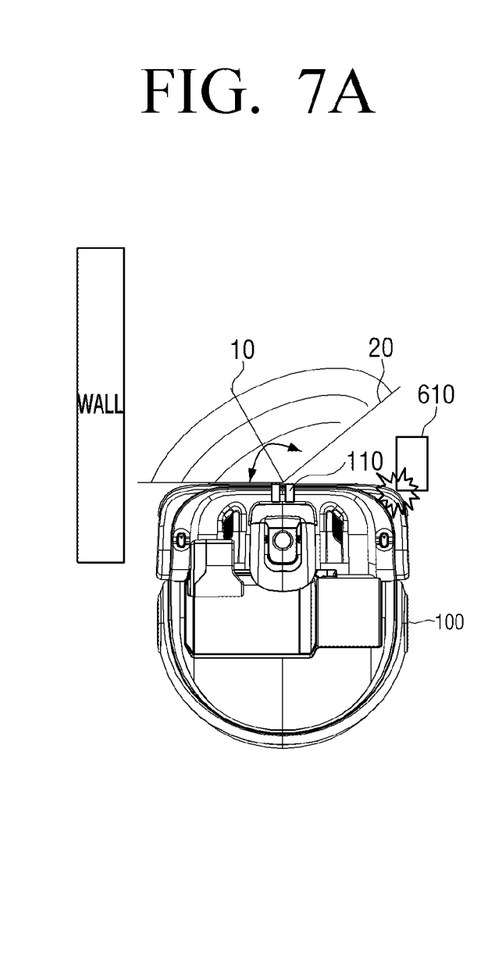
FIGS. 7A, 7B, and 7C are views explaining sensing range changes during sensing of an impact with an obstacle according to an embodiment of the present disclosure.
Figure 7B:
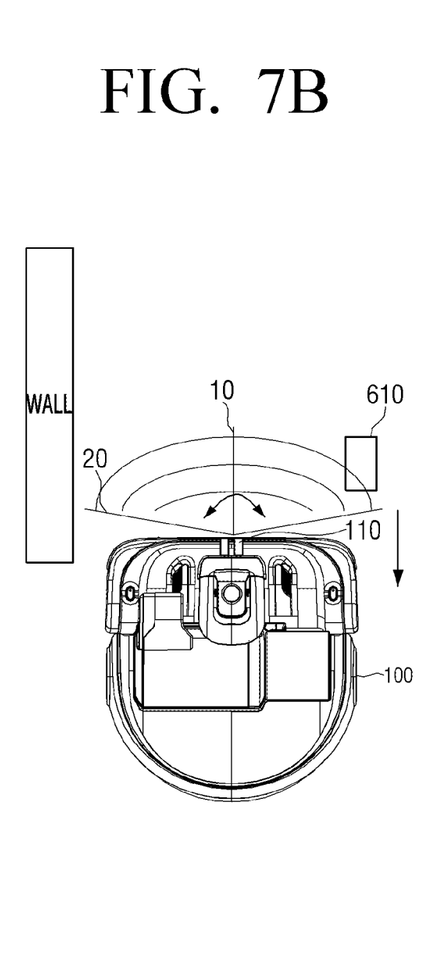
Figure 7C:
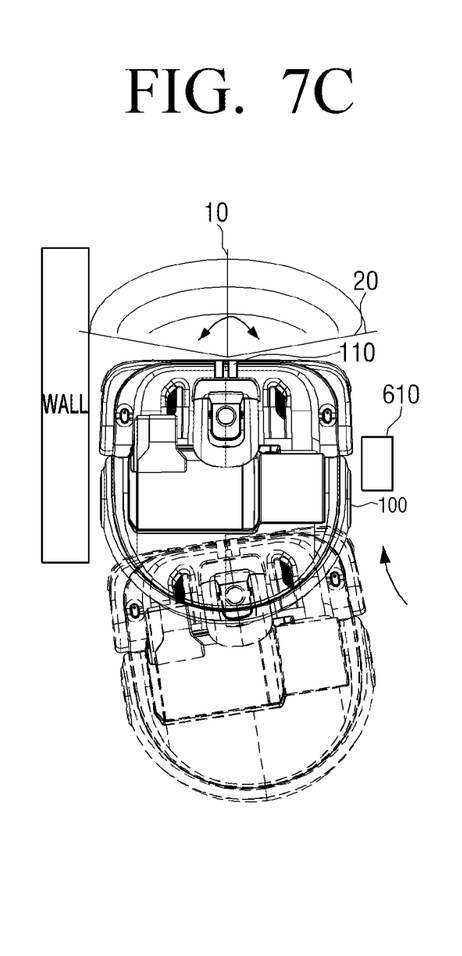

FIGS. 7A, 7B, and 7C are views explaining sensing range changes during sensing of an impact with an obstacle according to an embodiment of the present disclosure.

A robot cleaner 100 according to an embodiment of the present disclosure may be provided with an impact sensor. The impact sensor may be a sensor that senses whether an impact occurs between an obstacle 610 and the robot cleaner 100. The impact sensor may be implemented in various types including at least one of a contact type sensor and a non-contact type sensor. Accordingly, the contact type impact sensor 610 may detect a physical amount change due to the impact, and may determine whether the impact occurs on the basis of this. For example, the impact sensor 610 may be implemented by a limit switch, and if an impact occurs between the robot cleaner 100 and the obstacle, the limit switch may detect a pressure change to sense the impact. Further, the non-contact type sensor may be implemented by an ultrasonic sensor or a light sensor. The light sensor may sense an impact that occurs between the robot cleaner 100 and the obstacle through emission of at least one of ultraviolet radiation, infrared rays, and electromagnetic waves.

The robot cleaner 100 according to an embodiment of the present disclosure may be provided with one or more impact sensors. As illustrated in FIG. 7A, the impact sensors may be arranged on one side and the other side of the robot cleaner 100, but are not limited thereto. Accordingly, a plurality of impact sensors may be arranged on the robot cleaner 100.

As illustrated in FIGS. 7A and 7B, if the impact with the obstacle 610 is sensed by the impact sensor, the processor 140 may re-change the reference direction 10 so that an impact sensing direction is included in the predetermined angle range of 2α°. Accordingly, the reference direction 10 id deflected on the right or left side, and if an impact with the obstacle 610 is sensed on the other side during traveling, the processor 140 may control the sensor driver 120 to change the reference direction 10 so that the impact sensing direction is included in the reciprocating rotation range 20 of the sensor 110.

In the robot cleaner 100 according to an embodiment of the present disclosure, if the impact with the obstacle is sensed by the impact sensor, as illustrated in FIG. 7B, the cleaner main body performs backward traveling, and the reference direction 10 may be changed so that the obstacle 610 is included in the reciprocating rotation range 20 of the sensor. Accordingly, the sensor may grasp the accurate position of the obstacle 610.

The cleaner main body may travel to get away from the obstacle 610 by changing the traveling path as illustrated in FIG. 7C on the basis of the position of the obstacle that is sensed by the sensor 110.

Hereinafter, a method for changing a sensing area of a sensor 110 on the basis of a traveling direction of a robot cleaner 100 will be described.

Figure 8:
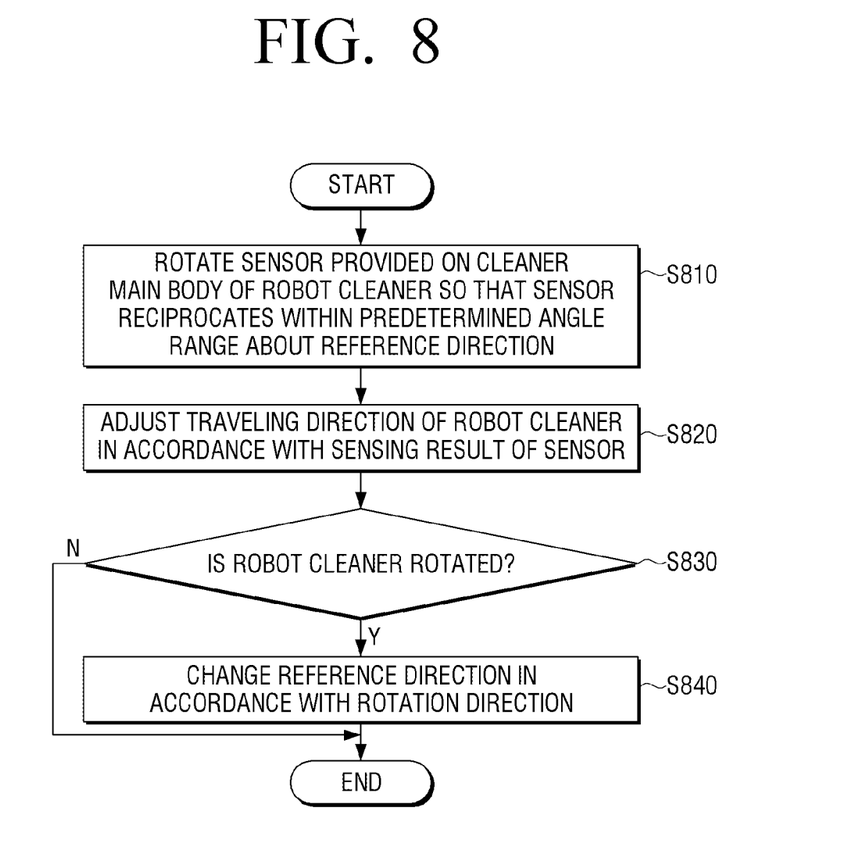
FIG. 8 is a flowchart illustrating a method for driving a robot cleaner according to an embodiment of the present disclosure.

FIG. 8 is a flowchart illustrating a method for driving a robot cleaner according to an embodiment of the present disclosure.

A sensor is provided on a cleaner main body of a robot cleaner 100 according to an embodiment of the present disclosure may be rotated to reciprocate within a predetermined angle range about a reference direction (S810).

Further, a traveling direction of the robot cleaner may be adjusted in accordance with the sensing result of the sensor (S820).

On the other hand, if the robot cleaner is rotated (S830:Y), the reference direction may be changed in accordance with the rotation direction (S840).

Further, if the cleaner main body travels to follow a wall, the reference direction may be changed in accordance with the position of the wall.

Further, if an obstacle is sensed within a reciprocating rotation range of the sensor, the reference direction may be changed on the basis of the position of the sensed obstacle.

On the other hand, the reciprocating rotation range of the sensor is sensed, and if the sensed reciprocating rotation range does not match a predetermined angle range of 2α°, at least one of the reference direction and the reciprocating rotation range may be changed.

Further, if obstacle impact is sensed, the reference direction may be re-changed so that the impact sensing direction is included in the angle range of 2α°.

Further, the sensor may be activated if there occurs at least one of: an event in which the cleaner main body secedes from a charging station during charging of the cleaner main body, an event in which a power of the charging station is turned off during charging of the cleaner main body, an event in which the cleaner main body is traveling, or an event in which the cleaner main body returns to the charging station for charging of the cleaner main body wherein the sensor is in an inactivated state; and the sensor may be inactivated if there occurs at least one of an event in which the cleaner main body is being charged, or an event in which the cleaner main body is in a standby state the sensor s in an activated state.

Further, the sensor 110 may be arranged to be inclined downward on the cleaner main body so as to sense the obstacle on the floor side on which the cleaner main body is put.

On the other hand, the robot cleaner 100 according to another embodiment of the present disclosure can change the reference direction in the case where the rotation angle of the cleaner main body is smaller than the predetermined value. Accordingly, if the cleaner main body performs rotation traveling at an angle that is larger than the predetermined value, the reference direction is not changed, but the sensor can be rotated to reciprocate.

Figure 9:
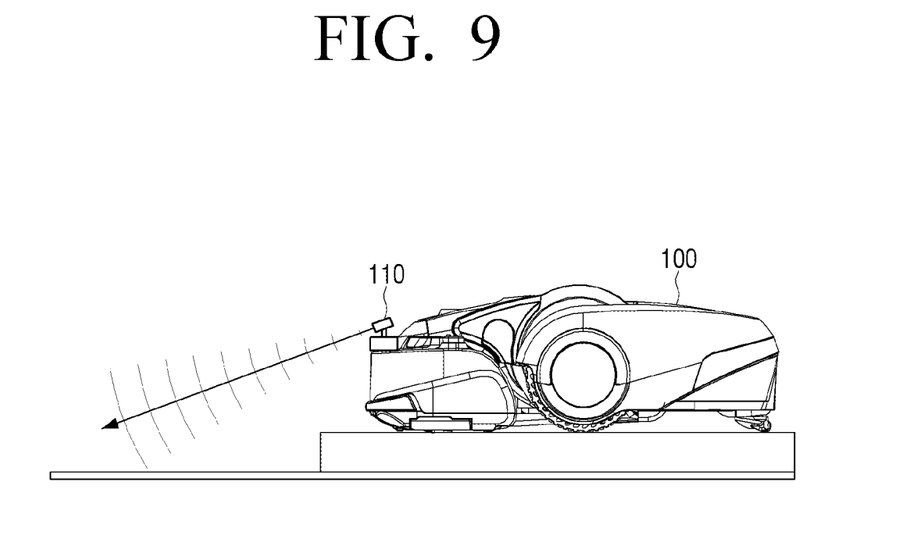
FIG. 9 is a view explaining a sensor arrangement according to an embodiment of the present disclosure.

FIG. 9 is a view explaining an arrangement of a sensor 110 according to an embodiment of the present disclosure.

A robot cleaner in the related art is provided with a separate drop detection sensor on a lower portion of a cleaner main body. The drop detection sensor may sense a distance from the floor during traveling of the robot cleaner, and based on this, the possibility of a drop of the cleaner main body may be determined to change the traveling direction.

As illustrated in FIG. 9, a robot cleaner 100 according to an embodiment of the present disclosure may be provided with a sensor 110 that is arranged to be inclined downward on the cleaner main body. Accordingly, the sensor 110 may sense the obstacle on the floor side on which the cleaner main body is put. Specifically, the sensor 110 may sense a distance between the cleaner main body and the floor on which the cleaner main body is put. A processor 140 may determine drop possibility of the cleaner main body according to the traveling direction on the basis of the sensing result. Drop possibility determination conditions in accordance with distance information that is sensed by the sensor 110 are as shown in Table 2 below, but are not limited thereto. A reference distance for determining an existence of the risk of dropping in accordance with the position and inclination of the sensor that is arranged on the cleaner main body may be changed.

TABLE 2

| Division | Drop possibility determination conditions |
| --- | --- |
| Normal traveling | 0.1 m ≥ (Distance information sensed by sensor) |
| Obstacle (e.g., threshold) | 0.1 m < (Distance information sensed by sensor) ≤ 0.15 m |
| Drop sensing | 0.15 m > (Distance information sensed by sensor) |

Accordingly, the robot cleaner 100 according to an embodiment of the present disclosure may determine the risk of dropping on the basis of the sensing result of the sensor 110, and may change the traveling direction.

While the invention has been shown and described with reference to embodiments thereof, it will be understood by those skilled in the art that various changes in form and detail may be made therein without departing from the spirit and scope of the present invention, as defined by the appended claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A robot cleaner comprising:
   a cleaner main body;
   a driver;
   a first sensor; and
   a processor configured to:
      control the first sensor to reciprocate in left and right directions within a predetermined angle range about a reference direction,
      based on sensing an obstacle within the predetermined angle range by the first sensor, control the driver to adjust a traveling direction of the cleaner main body in accordance with a position of the obstacle,
      in response to the cleaner main body performing left-rotation traveling based on the traveling direction; change the reference direction to be left of the traveling direction, and control the first sensor to reciprocate in the left and right directions within the predetermined angle range about the changed reference direction to the left, and in response to the cleaner main body performing right-rotation traveling based on the traveling direction:
change the reference direction to be right of the traveling direction, and control the first sensor to reciprocate in the left and right directions within the predetermined angle range about the changed reference direction to the right.

2. The robot cleaner as claimed in claim 1, wherein the processor is configured to change the reference direction in accordance with a position of a wall.

3. The robot cleaner as claimed in claim 1, further comprising a displacement sensor configured to sense a reciprocating rotation range of the first sensor, wherein the processor is configured to change at least one of the reference direction or the reciprocating rotation range based on a sensing result of the displacement sensor and the predetermined angle range.

4. The robot cleaner as claimed in claim 1, further comprising an impact sensor configured to sense an impact with the obstacle,
wherein the processor, in response to the obstacle impact being sensed by the impact sensor, is configured to re-change the reference direction so that an impact sensing direction is included in the predetermined angle range.

5. The robot cleaner as claimed in claim 1, wherein the processor is configured to: activate a sensor driver and the first sensor based on an occurrence of at least one of: an event in which the cleaner main body secedes from a charging station during charging of the cleaner main body, an event in which a power of the charging station is turned off during charging of the cleaner main body, or an event in which the cleaner main body is traveling, or an event in which the cleaner main body returns to the charging station for charging of the cleaner main body, and inactivate the sensor driver and the first sensor based on an occurrence of at least one of: an event in which the cleaner main body is being charged, or an event in which the cleaner main body is in a standby state.

6. The robot cleaner as claimed in claim 1, wherein the first sensor is arranged to be inclined downward on the cleaner main body so that the cleaner main body senses the obstacle on a surface on which the cleaner main body is located.

7. A method for driving a robot cleaner, comprising:
controlling, by a processor of the robot cleaner, a first sensor provided on a cleaner main body of the robot cleaner to reciprocate in left and right directions within a predetermined angle range about a reference direction;
based on sensing an obstacle within the predetermined angle range by the first sensor, adjusting, by the processor of the robot cleaner, a traveling direction of the robot cleaner in accordance with a position of the obstacle; and
in response to the cleaner main body performing left-rotation traveling based on the traveling direction:
changing, by the processor of the robot cleaner, the reference direction to be left of the traveling direction, and
controlling the first sensor to reciprocate in the left and right directions within the predetermined angle range about the changed reference direction to the left, and
in response to the cleaner main body performing right-rotation traveling based on the traveling direction:
change the reference direction to be right of the traveling direction, and
control the first sensor to reciprocate in the left and right directions within the predetermined angle range about the changed reference direction to the right.

8. The method as claimed in claim 7, further comprising changing the reference direction in accordance with a position of a wall.

9. The method as claimed in claim 7, further comprising changing, in response to an obstacle being sensed within a reciprocating rotation range of the first sensor, the reference direction based on a position of an obstacle.

10. The method as claimed in claim 7, further comprising: sensing, by a displacement sensor, a reciprocating rotation range of the first sensor; and changing at least one of the reference direction or the reciprocating rotation range based on a sensing result of the displacement sensor and the predetermined angle range.

11. The method as claimed in claim 7, further comprising: sensing, by an impact sensor, an impact with the obstacle; and
in response to the obstacle impact being sensed, re-changing the reference direction so that an impact sensing direction is included in the predetermined angle range.

12. The method as claimed in claim 7, further comprising:
activating the first sensor if there occurs at least one of:
an event in which the cleaner main body secedes from a charging station during charging of the cleaner main body,
an event in which a power of the charging station is turned off during charging of the cleaner main body,
an event in which the cleaner main body is traveling, or
an event in which the cleaner main body returns to the charging station for charging of the cleaner main body wherein the first sensor is in an inactivated state; and
inactivating the first sensor if there occurs at least one of:
an event in which the cleaner main body is being charged, or
an event in which the cleaner main body is in a standby state wherein the first sensor is in an activated state.

13. The method as claimed in claim 7, wherein the first sensor is arranged to be inclined downward on the cleaner main body so that the cleaner main body senses the obstacle on a surface on which the cleaner main body is located.

* * * * *